(12) United States Patent
Tanizoe et al.

(10) Patent No.: US 7,019,781 B2
(45) Date of Patent: Mar. 28, 2006

(54) DIGITAL CAMERA IN WHICH THE PROCESSING METHOD IS CHANGED ACCORDING TO FOCUS POSITION BEFORE THE SHUTTER IS RELEASED

(75) Inventors: Yukihiro Tanizoe, Neyagawa (JP); Shigeo Sakaue, Toyonaka (JP); Kazuyuki Inokuma, Yawata (JP); Toshiya Fujii, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 792 days.

(21) Appl. No.: 10/107,485

(22) Filed: Mar. 28, 2002

(65) Prior Publication Data

US 2002/0101529 A1 Aug. 1, 2002

Related U.S. Application Data

(62) Division of application No. 09/008,607, filed on Jan. 16, 1998, now Pat. No. 6,753,917.

(30) Foreign Application Priority Data

| Jan. 20, 1997 | (JP) | ......................................... 9-7734 |
| Jun. 17, 1997 | (JP) | ................................... 9-159715 |
| Aug. 1, 1997 | (JP) | ................................... 9-207496 |

(51) Int. Cl.
*H04N 5/232* (2006.01)

(52) U.S. Cl. .................. 348/345; 348/333.01
(58) Field of Classification Search ................ 348/345, 348/349, 347, 222.1
See application file for complete search history.

(56) References Cited

U.S. PATENT DOCUMENTS 4,691,253 A 9/1987 Silver

| 5,040,068 | A | | 8/1991 | Parulski et al. |
| 5,070,405 | A | | 12/1991 | Ejima et al. |
| 5,382,974 | A | * | 1/1995 | Soeda et al. ............. 348/221.1 |
| 5,396,290 | A | | 3/1995 | Kannegundla et al. |
| 5,412,424 | A | | 5/1995 | Ejima et al. |
| 5,589,879 | A | | 12/1996 | Saito et al. |
| 5,650,819 | A | | 7/1997 | Sato et al. |
| 5,751,348 | A | | 5/1998 | Inuiya et al. |
| 5,929,906 | A | | 7/1999 | Arai et al. |
| 6,072,526 | A | | 6/2000 | Hashimoto et al. |
| 2005/0083430 | A1 | * | 4/2005 | Hirasawa et al. ........... 348/349 |

FOREIGN PATENT DOCUMENTS

| CN | 1095538 | 11/1994 |
| DE | 40 18 492 | 12/1991 |
| EP | 0 517 474 | 12/1992 |
| EP | 0 517 908 | 12/1993 |
| EP | 0 579 165 | 1/1994 |
| EP | 0 608 099 | 7/1994 |
| JP | 7-107358 | 4/1995 |
| JP | 8-205035 | 8/1996 |
| WO | 96/21317 | 7/1996 |

* cited by examiner

*Primary Examiner*—Tuan Ho
(74) *Attorney, Agent, or Firm*—Wenderoth, Lind & Ponack, L.L.P.

(57) ABSTRACT

A digital camera with interchangeable displays having a built-in display device and an image output terminal for transmitting image signals to an external monitor device, characterized in that it has a plurality of means for processing the image, outputting a suitable image to the built-in display device or to the external monitor device by switching between the means for processing the image on the basis of prescribed signals.

3 Claims, 17 Drawing Sheets

Fig.2

| | Ye | | Cy | | Ye | | Cy | | Ye |
|---|---|---|---|---|---|---|---|---|---|
| r | Mg | Gr | Mg | Gr | Mg | Gr | M |
| y | Ye | Cy | Ye | Cy | Ye | Cy | Ye |
| Gr | Mg | Gr | Mg | Gr | Mg | Gr | M |
| y | Ye | Cy | Ye | Cy | Ye | Cy | Ye |
| Gr | Mg | Gr | Mg | Gr | Mg | Gr | M |

DIGITAL CAMERA IN WHICH THE PROCESSING METHOD IS CHANGED ACCORDING TO FOCUS POSITION BEFORE THE SHUTTER IS RELEASED

This is a Divisional Application of Ser. No. 09/008,607, filed Jan. 16, 1998 now U.S. Pat. No. 6,753,917.

BACKGROUND TO THE INVENTION

1. Field of the Invention

The present invention relates to a device for interchanging displays in a digital camera, and more precisely to a device for interchanging displays in a digital camera whereby the method of display changes between displaying the image with a built-in liquid crystal device and displaying it on a monitor device by linking the camera to the monitor device with the help of a video cable, and between when focusing and not focusing.

2. Description of the Related Art

Some digital cameras, in addition to having a small liquid crystal or other display device, have an image output terminal whereby image signals are fed to an external monitor device. With digital cameras, insofar as the image is being viewed on the liquid crystal display device, the screen is relatively small and it does not detract very much from the quality of the image even if it is displayed using an image signal which has been processed so as to cull a large number of pixels. However, this is not so if an image signal of this sort is used to display the image on a monitor device with a large screen.

The situation is that especially where the image is processed by means of a microprocessor, it is possible to shorten the time required for processing in direct proportion to the number of pixels that are culled.

Conventional digital cameras have made use of image signals from the same image processing circuit irrespective of whether the image is viewed on the liquid crystal display device built into the camera or on an external monitor device. Consequently, with a conventional digital camera where the image processing circuit of the camera is one which culls large numbers of pixels during image processing, the image has been rough and the quality defective when viewed on an external monitor device using a video cable. Conversely, if the image processing circuit of the camera does not cull large numbers of pixels, it takes a long time to process the image, so that there is a long interval between frames in the quasi-dynamic image displayed on the liquid crystal display device of the digital camera.

Moreover, if the same tone is employed when displaying the image signal on a liquid crystal display device as when displaying it on an external monitor, it can become difficult to see the liquid display device, particularly when photographing in bright light outdoors.

Furthermore, when adjusting the focus manually, the user does so while viewing the image displayed on the liquid crystal display. This can be problematic in that the extreme smallness of the display makes it difficult to decide whether or not it is in focus.

SUMMARY OF THE INVENTION

With a view to solving the above mentioned problems, it is a first object of the present invention to provide a digital camera with interchangeable displays wherein large numbers of pixels are culled in processing the image signal which is output for display on the display device which is built into the camera, while a smaller number are culled in processing the image signal which is output for display on an external monitor device using a video cable.

Moreover, it is a second object of the present invention to provide a digital camera with interchangeable displays wherein contrast is emphasized in processing the image signal which is output for display on the display device which is built into the camera, while reproduction of tone is emphasized in processing the image signal which is output for display on an external monitor device using a video cable.

Furthermore, it is a third object of the present invention to provide a digital camera with interchangeable displays wherein during adjustment of the focus an image signal is output which is processed in such a manner that part of the image is enlarged.

In order to attain the above mentioned objects, the present invention is a digital camera having a built-in display device and an image output terminal which transmits image signals to an external monitor device, and comprising means for changing the position of the focus, means for detecting the position of the focus, means for detecting whether or not the video cable has been inserted, means for changing the method of processing employed in the means for processing the image, and a method of feeding the output of the means for processing the image to the image output terminal.

The above configuration permits the realization of a digital camera with interchangeable displays wherein large numbers of pixels are culled and the image signal is processed at high speed when it is being output for display on the display device which is built into the camera, while a smaller number of pixels are culled with higher image quality when processing the image signal which is output for display on an external monitor device using a video cable.

Moreover, it permits the realization of a digital camera with interchangeable displays wherein contrast is emphasized in processing the image signal which is output for display on the display device which is built into the camera, while reproduction of tone is emphasized in processing the image signal which is output for display on an external monitor device using a video cable.

Furthermore, it permits the realisation of a digital camera with interchangeable displays wherein during adjustment of the focus an image signal is output which is processed in such a manner that part of the image is enlarged.

BRIEF DESCRIPTION OF THE DRAWINGS

FIG. 2 is a diagram illustrating part of the color filter which is fitted to the surface of the CCD;

DESCRIPTION OF THE PREFERRED EMBODIMENTS (Embodiment 1)

Figure 1:
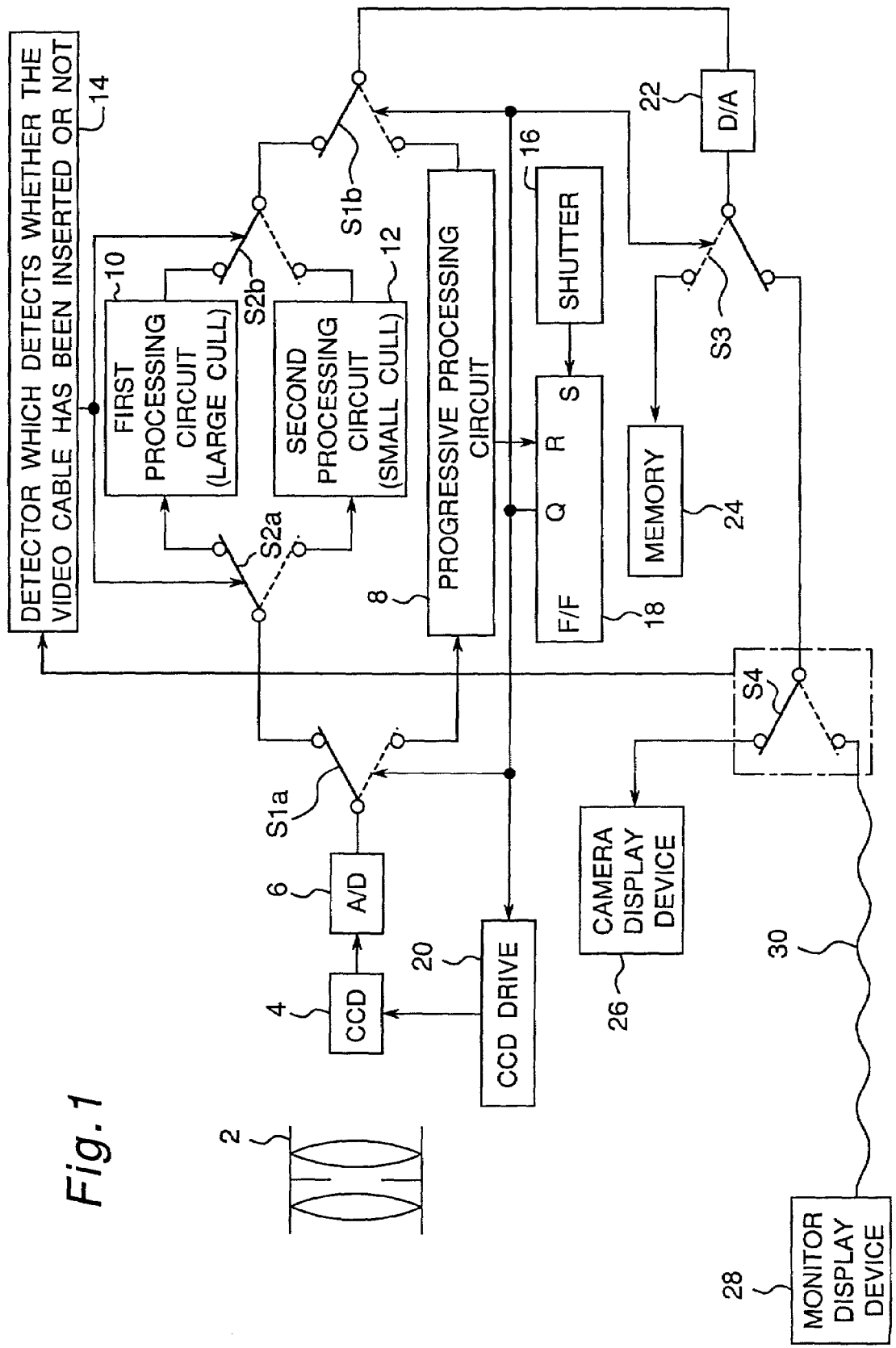
FIG. 1 is a block diagram illustrating the first embodiment of the digital camera with interchangeable displays to which the present invention pertains.

FIG. 1 is a block diagram illustrating the first embodiment of the digital camera with interchangeable displays to which the present invention pertains, and depicts a device for changing the display mode by inserting or removing the video cable. In the device to which the present invention pertains, the image is displayed with rough picture quality at a higher number of frames per second (eg 6 frames/sec) on the display device of the camera itself, but at a lower number of frames per second (eg 4 frames/sec) and finer picture quality when the video cable is inserted and the image displayed on a television or other external monitor device 28.

In FIG. 1, means for capturing an image is composed of a lens 2 and a charge-coupled device (CCD) 4. The CCD 4 has on its surface for the purpose of coloration, for instance, a color filter of the type illustrated in FIG. 2. 6 is an A/D converter, 8 is a progressive processing circuit which processes image signals without culling of pixel signals, 10 is a first processing circuit which culls large numbers of pixel signals, 12 is a second processing circuit which culls fewer pixel signals, 14 is a detector which detects whether the video cable has been inserted or not, 16 is the shutter button of the digital camera, 18 is a flip-flop, 20 is a CCD drive circuit, 22 is a D/A converter, 24 is a bit map memory which memorizes the image which has been captured, 26 is the display device which is located on the body of the camera and is preferably a liquid crystal display, 28 is a television or other display device, 30 is the video cable which connects the display device 28 to the digital camera, S1a and S1b are interlocking switches which change in accordance with the Q output of the flip-flop 18, S2a and S2b are interlocking switches which change in accordance with the output from the detector 14 for detecting whether the video cable has been inserted or not, S3 is a third switch which changes in accordance with the Q output of the flip-flop 18, and S4 is a fourth switch which change in accordance with whether the video cable 30 from the external monitor device 28 has been inserted or not, and constitutes the image output terminal.

When the shutter button 16 is not being depressed, a low-level signal is output from the Q output of the flip-flop 18, as a result of which the CCD drive circuit 20 counts the adjoining pixels of the CCD 4. For example, it counts the magenta (Mg) and yellow (Ye) pixels above and below, and the green (G) and cyan (C) pixels above and below, outputting simplified image data in PD Mix mode, so to speak. The low-level signal from the Q output also causes the first interlocking switches S1a and S1b to be set in the positions denoted by the unbroken lines, while also causing the switch S3 to assume the position denoted by the unbroken line.

In a state where the shutter button is not being depressed, action differs between when the video cable 30 is removed and the switch S4 is in the position denoted by the unbroken line (main body display mode), and when the video cable 30 is inserted and the switch S4 is in the position denoted by the broken line (monitor display mode).

In main body display mode, the video cable 30 is removed, and the detector 14 for detecting whether the video cable has been inserted or not detects this state. When it does so, it outputs a first signal (eg a high-level signal), and the interlocking switches S2a and S2b are set in the positions denoted by the unbroken lines. Consequently, the PDMix mode image signal obtained from the CCD 4 is fed by way of the A/D converter 6, the first processing circuit 10 and the D/A converter 22 to the liquid crystal display 26 on the main body of the camera. As will be explained later, the first processing circuit 10 culls large numbers of pixel signals while processing the image, and so it is able to construct the image very quickly (eg at 6 frames/sec).

In monitor display mode, the video cable 30 is inserted, and the detector 14 for detecting whether the video cable has been inserted or not detects this state. When it does so, it outputs a second signal (eg a low-level signal), and the interlocking switches S2a and S2b are set in the positions denoted by the broken lines. Consequently, the PDMix mode image signal obtained from the CCD 4 is fed by way of the A/D converter 6, the second processing circuit 12 and the D/A converter 22 to the monitor display device 28. As will be explained later, the second processing circuit 12 culls a relatively small number of pixel signals while processing the image, and so while it constructs the image slowly (eg at 4 frames/sec), the completed image is sharper than in the case of main body display mode.

If the shutter button 16 is depressed, a set signal is input into the S input of the flip-flop 18, and a high-level signal is output from the Q output of the same, as a result of which the CCD drive circuit 20 is set in progressive mode wherein it outputs all the pixels of the CCD 4 without modification. The high-level signal from the Q output also causes the first interlocking switches S1a and S1b to be set in the positions denoted by the broken lines, as also the switch S3. This means that the progressive mode video signal obtained from the CCD 4 is fed by way of the A/D converter 6, the progressive processing circuit 8 and the D/A converter 22 to the memory 24. In the progressive processing circuit 8, one frame of image data is processed progressively and fed as bit map data to the memory 24. When the progressive processing of one frame of image data is complete and all the pixel signals are memorized in the bit map memory 24, the progressive processing circuit 8 inputs a re-set signal into the R input of the flip-flop 18, and a low-level signal is output from the Q output of the same. As a result of this low-level signal, the CCD drive circuit 20 is set again in PDMix mode. Also as a result of the low-level signal from the Q output, the first interlocking switches S1*a* and S1*b* are set in the positions denoted by the unbroken lines, and the switch S3 is returned to the position denoted in the same manner.

If the video cable has been removed and the switch S4 is in the position denoted by the unbroken line, namely if the device is in main body display mode, as has been explained above, frames are constructed quickly by the first processing circuit 10 and displayed on the liquid crystal display device 26 on the main body of the camera. Meanwhile, If the video cable has been inserted and the switch S4 is in the position denoted by the broken line, namely if the device is in monitor display mode, as has been explained above, frames are constructed slowly by the second processing circuit 12 and displayed on the monitor display device 28. Processing is slower, but the completed image is sharper than in the case of main body display mode.

Figure 3:
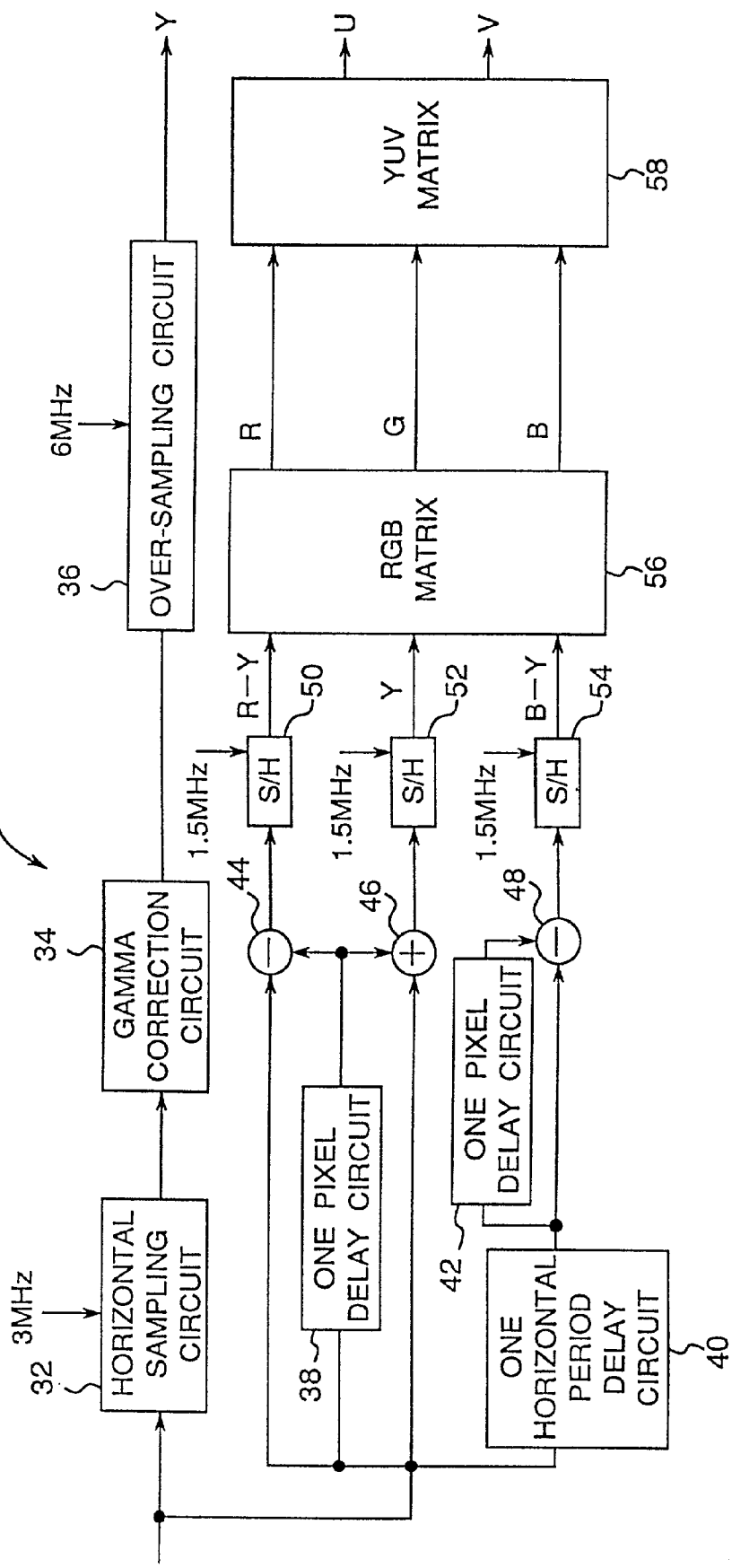
FIG. 3 is a block diagram illustrating the first image processing circuit 10 depicted in FIG. 1.

FIG. 3 is a block diagram illustrating the first image processing circuit 10 depicted in FIG. 1. In the drawing, 32 is a horizontal sampling circuit, 34 is a gamma correction circuit, 36 is an over-sampling circuit, 38 is a one pixel delay circuit, 40 is a one horizontal period delay circuit, 42 is a one pixel delay circuit, 44 is a subtracter, 46 is an adder, 48 is a subtracter, 50, 52 and 54 are each sample-hold circuits, 56 is an RGB matrix, and 58 is a YUV matrix.

The horizontal sampling circuit 32 samples the brightness signal Y with a 3 MHz clock. If pixel signals are being fed at 12 MHz, this means that one pixel in four is sampled, if there are 640 pixels in one horizontal period, 160 pixels are sampled. The degree of culling is determined by this horizontal sampling circuit 32. Here it is a relatively large cull. Culled brightness signals pass through the gamma correction device 34 and are converted to 6 MHz in the over-sampling circuit 36. The same rate of Y output is obtained as with the second processing circuit illustrated in FIG. 4 and described below.

The sample-hold circuits 50, 52 and 54 sample and hold R-Y, Y and B-Y signals respectively with 1.5 MHz clocks. The R-Y, Y and B-Y signals are sampled and held, while R, G and B signals are constructed by the RGB matrix 56, together with U and V signals by the YUV matrix.

Compared with the second processing circuit 12 illustrated in FIG. 4 and described below, the first processing circuit 10 illustrated in FIG. 3 has a smaller number of gamma-corrected Y signals, while gamma correction of the LPF circuit in the circuit which processes color signals and the R, G and B color signals is omitted. This allows high-speed processing, and images are generated at 6 frames/sec, for instance.

The first processing circuit illustrated in FIG. 3 is the circuit which operates during main body display mode, and generates six frames per second. As a result, it is possible to speed up the renewal rate of the liquid crystal display device 26 on the main body.

Figure 4:
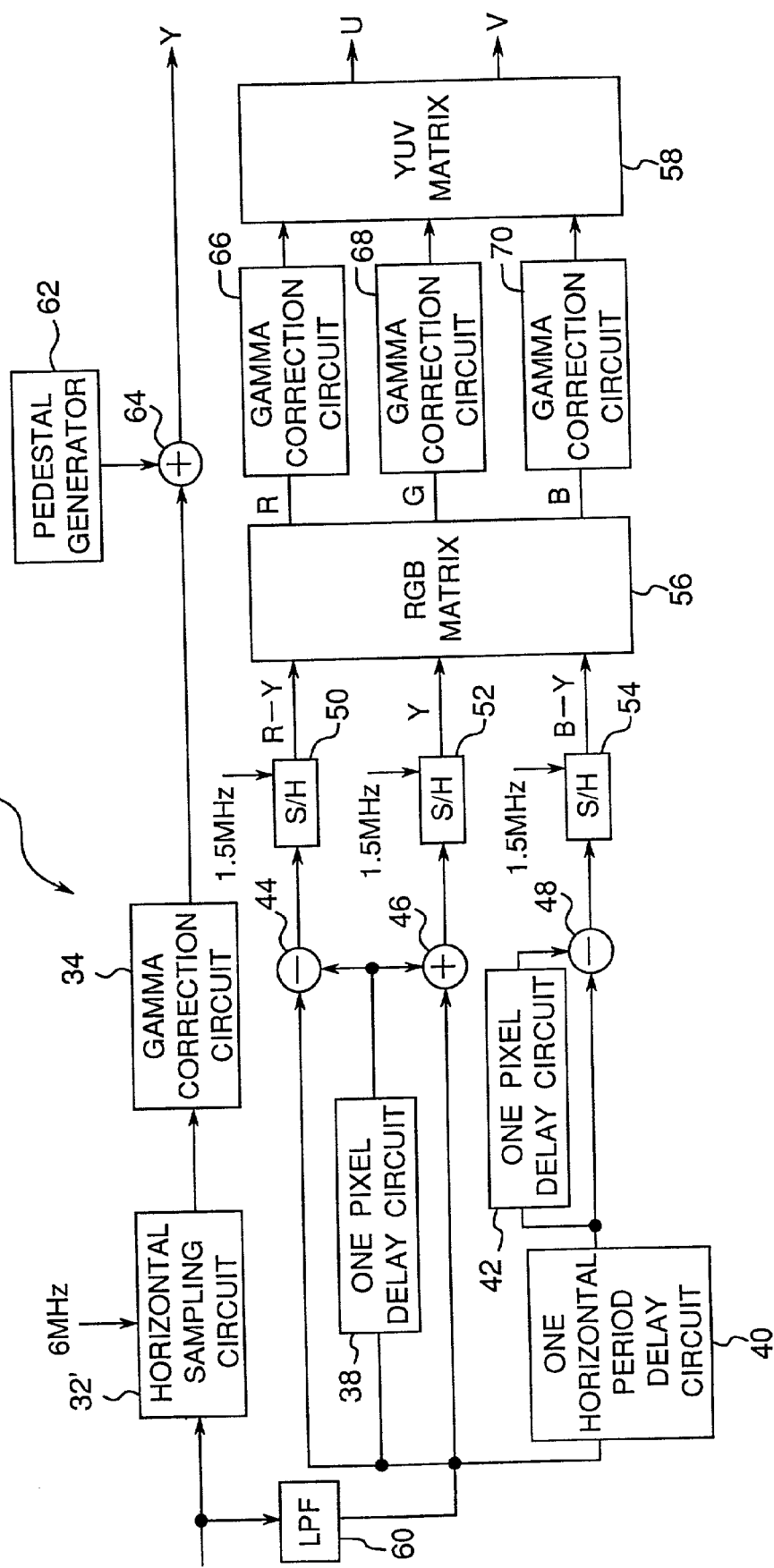
FIG. 4 is a block diagram illustrating the second image processing circuit 12 depicted in FIG. 1.

FIG. 4 is a block diagram illustrating the second image processing circuit 12 depicted in FIG. 1. It differs from the first processing circuit illustrated in FIG. 3 in that the sampling frequency of horizontal sampling circuit 32' is 6 MHz, while it also has a low-pass filter 60, a pedestal generator 62, an adder 64, and gamma correction circuits 66, 68 and 70. In all other respects it is configured in the same manner as depicted in FIG. 3, and a description will be omitted.

The horizontal sampling circuit 32' samples the brightness signal Y with a 6 MHz clock. The degree of culling is smaller than in the case of the horizontal sampling circuit 32, and images are generated at the rate of four frames per second. Since the degree of culling is small, it is possible to construct a fine-grained image even on a large monitor screen.

The provision of a low-pass filter 60 on the circuit which processes color makes it possible to suppress untrue colors at points where the brightness changes.

The provision of a pedestal generator 62 and the addition of a pedestal signal to the brightness signal allows the construction of images with good reproduction of tone in dark areas.

Figure 5:
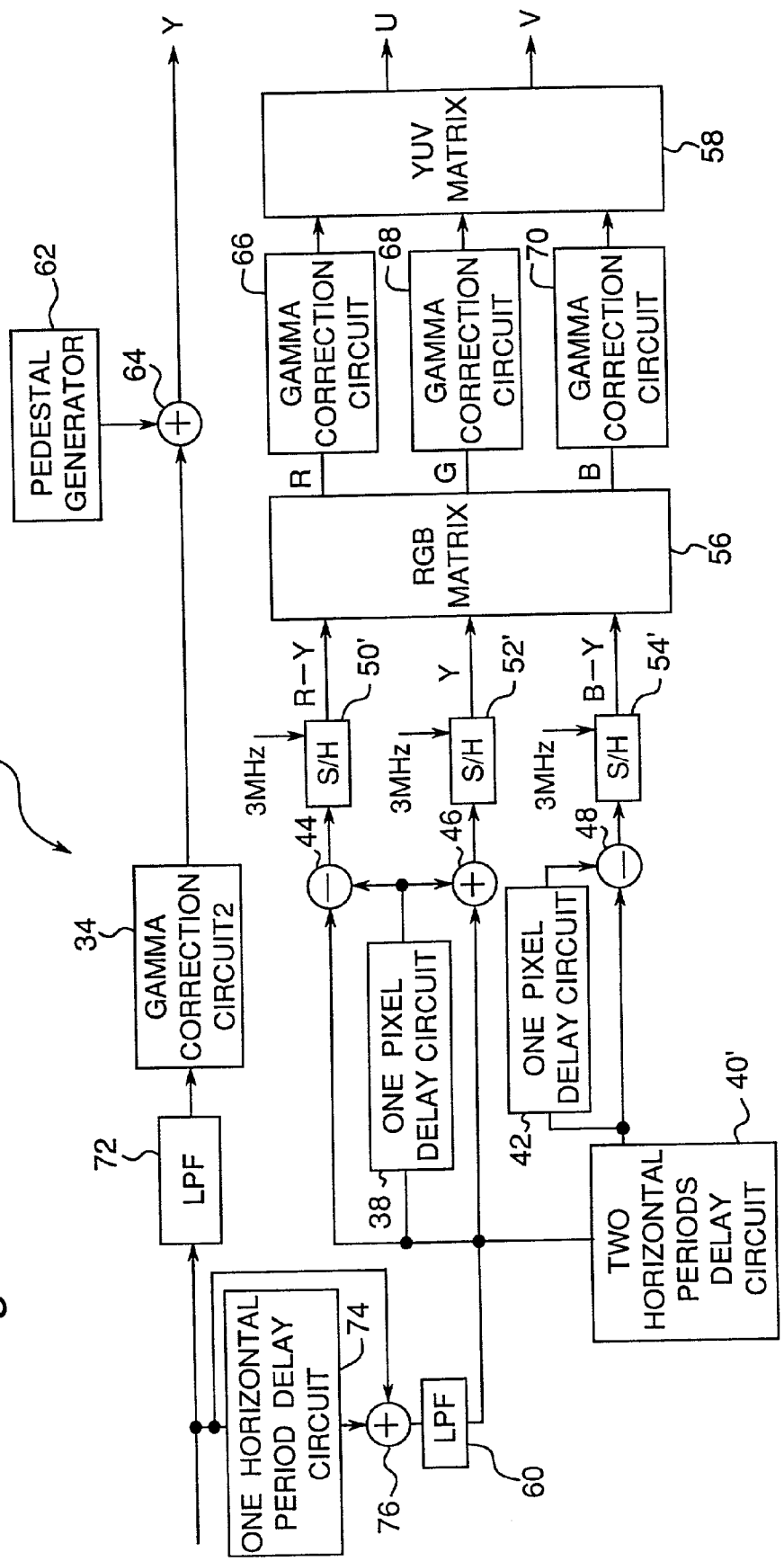
FIG. 5 is a block diagram illustrating the progressive processing circuit 8 depicted in FIG. 1.

FIG. 5 is a block diagram illustrating a progressive processing circuit 8. This differs from the second processing circuit 12 illustrated in FIG. 4 in that the circuit which processes the brightness signal has a low-pass filter 72 in place of the horizontal sampling circuit 32', while the circuit which processes color has in addition a horizontal period delay circuit 74 and an adder 76. Moreover, the delay circuit provided on the circuit which processes the B-Y signal is not the one horizontal period delay circuit 40 but the two horizontal periods delay circuit 40', and the sampling frequency of the sample-hold circuits 50', 52' and 54' is 3 MHz.

Because there is no horizontal sampling circuit to sample brightness signals on the progressive circuit 8, all the pixel signals are sampled, and it is therefore possible to feed image signals of the highest picture quality to the recorded image.

(Embodiment 2)

Figure 6:
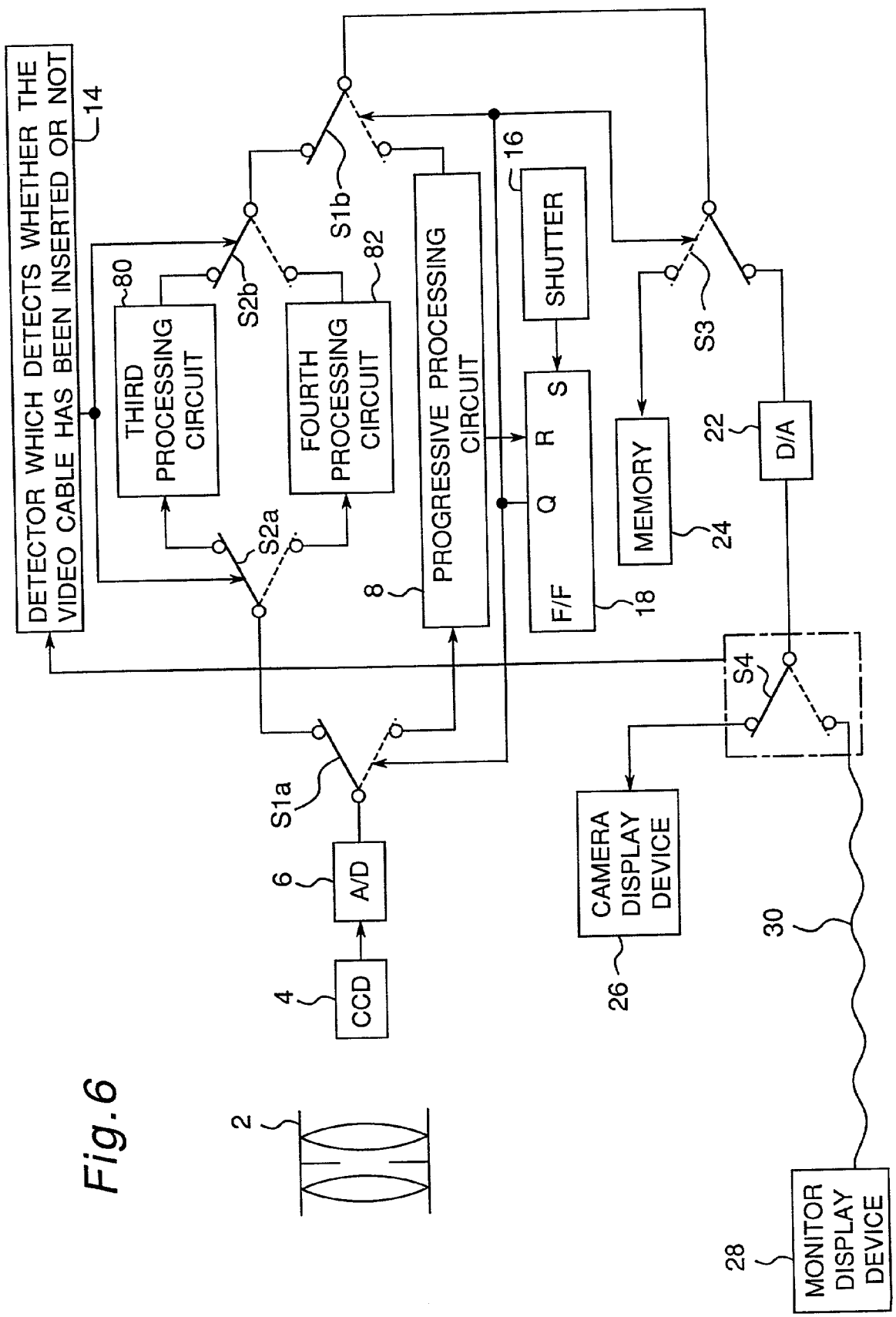
FIG. 6 is a block diagram illustrating the second embodiment of the digital camera with interchangeable displays to which the present invention pertains.

FIG. 6 is a block diagram illustrating the second embodiment of the digital camera with interchangeable displays to which the present invention pertains. In the device to which the present invention pertains, a third processing circuit 80 makes it possible to display an image which has been processed with emphasis on contrast in such a manner as to be easy to view outdoors on the display device 26 of the camera itself, while a fourth processing circuit 82 makes it possible to display an image which has been processed with emphasis on reproduction of tone in such a manner as to be easy to view when the video cable is inserted and the image is displayed on a television or other external monitor device 28.

In FIG. 6, 80 is the third processing circuit whereby the image is processed with emphasis on contrast, and 82 is the fourth processing circuit whereby it is processed with emphasis on reproduction of tone.

When the shutter button 16 is not being depressed, a low-level signal is output from the Q output of the flip-flop 18, as a result of which the first interlocking switches S1*a* and S1*b* are set in the positions denoted by the unbroken lines, while the switch S3 also assumes the position denoted by the unbroken line.

In a state where the shutter button is not being depressed, action differs between when the video cable 30 is removed and the switch S4 is in the position denoted by the unbroken line (main body display mode), and when the video cable 30 is inserted and the switch S4 is in the position denoted by the broken line (monitor display mode).

In main body display mode, the video cable 30 is removed, and the detector 14 for detecting whether the video cable has been inserted or not detects this state. When it does so, it outputs a first signal (eg a high-level signal), and the interlocking switches S2*a* and S2*b* are set in the positions denoted by the unbroken lines. Consequently, the signal obtained from the CCD 4 is fed by way of the A/D converter 6, the third processing circuit 80 and the D/A converter 22 to the liquid crystal display 26 on the main body of the camera. As will be explained later, the third processing circuit 80 lays emphasis on contrast while processing the image, and so it is able to display the image in such a manner as to be easy to view outdoors on the liquid crystal display device.

In monitor display mode, the video cable 30 is inserted, and the detector 14 for detecting whether the video cable has been inserted or not detects this state. When it does so, it outputs a second signal (eg a low-level signal), and the interlocking switches S2a and S2b are set in the positions denoted by the broken lines. Consequently, the signal obtained from the CCD 4 is fed by way of the A/D converter 6, the fourth processing circuit 82 and the D/A converter 22 to the monitor display device 28. As will be explained later, the fourth processing circuit 82 processes the image with good reproduction of tone. This means that if viewed outdoors the contrast is poorer than in the main body display mode, but this presents no problem because it is highly unlikely that images will be captured outdoors with the video cable inserted.

Figure 7:
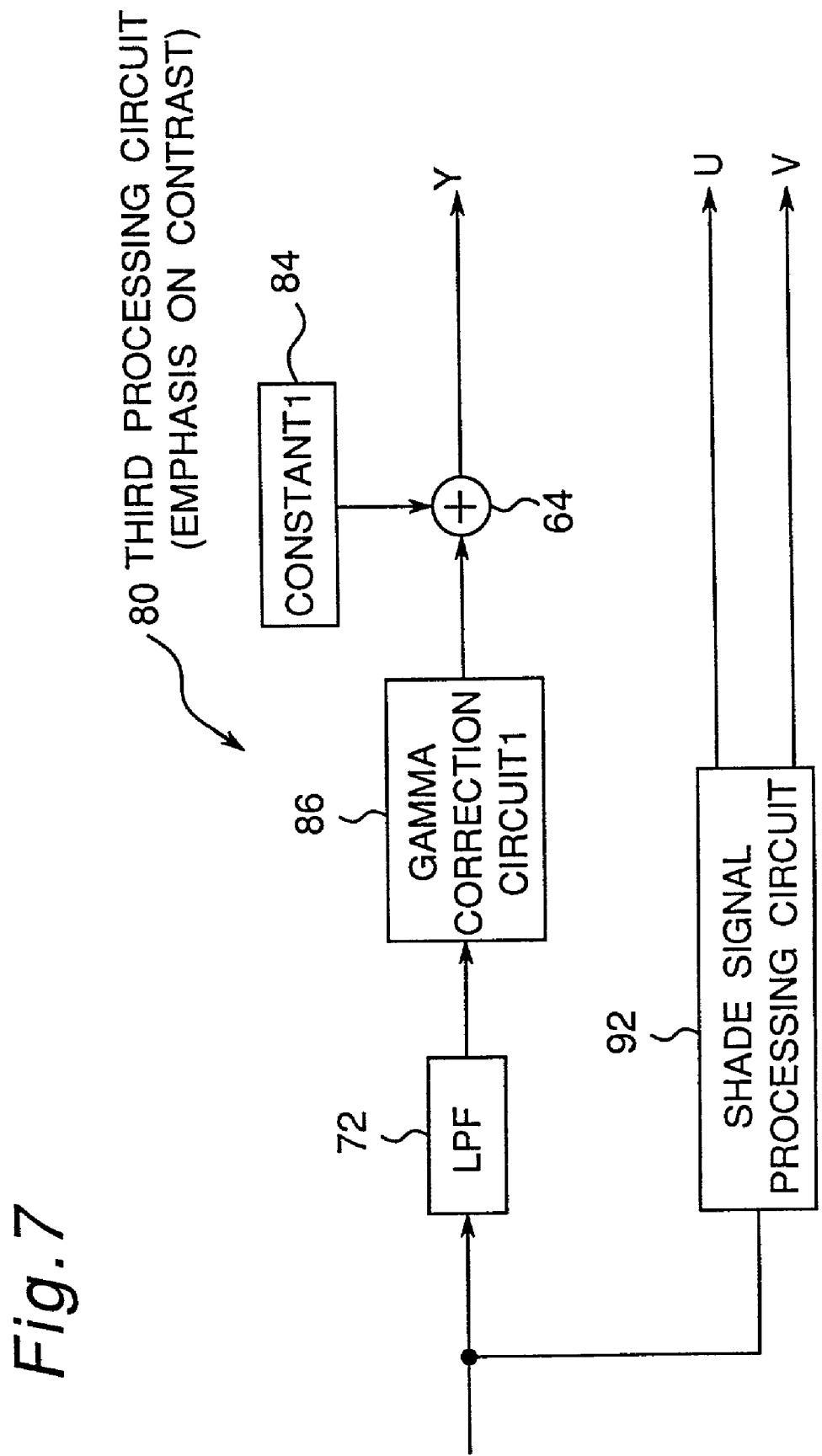
FIG. 7 is a block diagram illustrating the third image processing circuit 80 depicted in FIG. 6.
Figure 8:
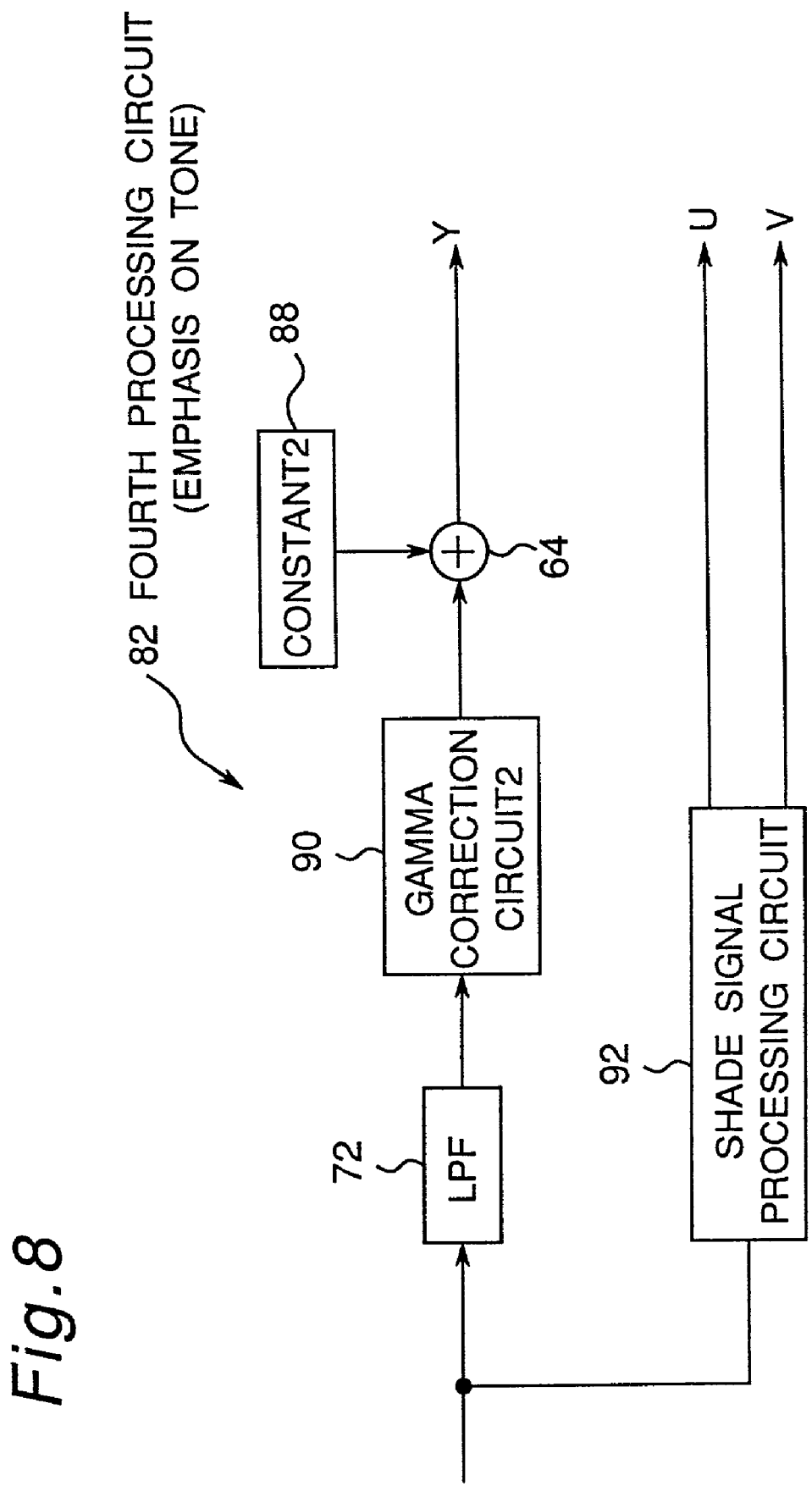
FIG. 8 is a block diagram illustrating the fourth image processing circuit 82 depicted in FIG. 6.

FIGS. 7 and 8 are block diagrams illustrating respectively the third image processing circuit 80 and the fourth image processing circuit 82. In the drawings, 84 and 88 are constants which are added to the brightness signal, 86 and 90 are gamma correction circuits, and 92 is a shade signal processing circuit. In the third processing circuit 80, as the drawing shows, a constant 1 is added in the adder 64, while a constant 2 is added in the fourth processing circuit 82.

For the constant 2, a value is chosen which will allow tone reproduction in dark areas to improve. However, in this case even those parts where the image is dark come to have a brightness value greater than the constant 2, and the brightness ratio between the bright and dark areas decreases. In other words, the contrast decreases, and the image becomes difficult to see, particularly when viewed on the built-in liquid crystal display device in bright light outdoors.

For the constant 1, a value smaller than that of the constant 2 is chosen. In this manner it is possible to obtain an image with a large amount of contrast, which is easy to see when viewed outdoors on a liquid crystal screen.

As may also be seen from FIGS. 7 and 8, the method of gamma correction processing differs between the third processing circuit 80 and the fourth processing circuit 82. Gamma correction processing circuits comprise look-up tables.

If the input of the look-up table is x and the output y, a look-up table for gamma correction should normally produce a relationship $y=x^\gamma$. Supposing the relationship between the input and output of the look-up tables for gamma correction in FIGS. 4 and 5 is $y=x^{\gamma 1}$ and $y=x^{\gamma 2}$ respectively, constructing a look-up table to yield the relationship $\gamma 1 > \gamma 2$ will allow an image with a greater degree of contrast to be obtained in the third processing circuit than in the fourth processing circuit.

Figure 9:
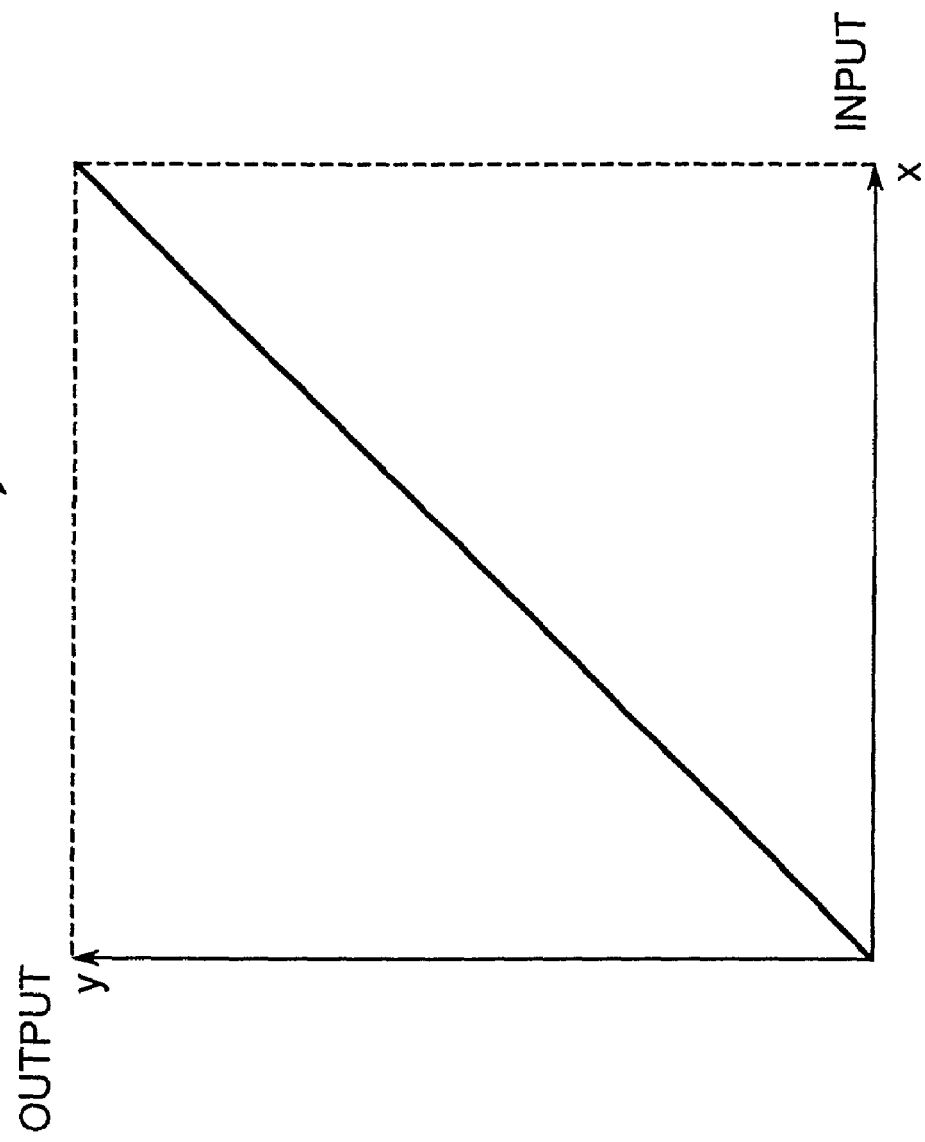
FIG. 9 is a diagram illustrating the input/output relationship of the gamma correction circuit 86.
Figure 10:
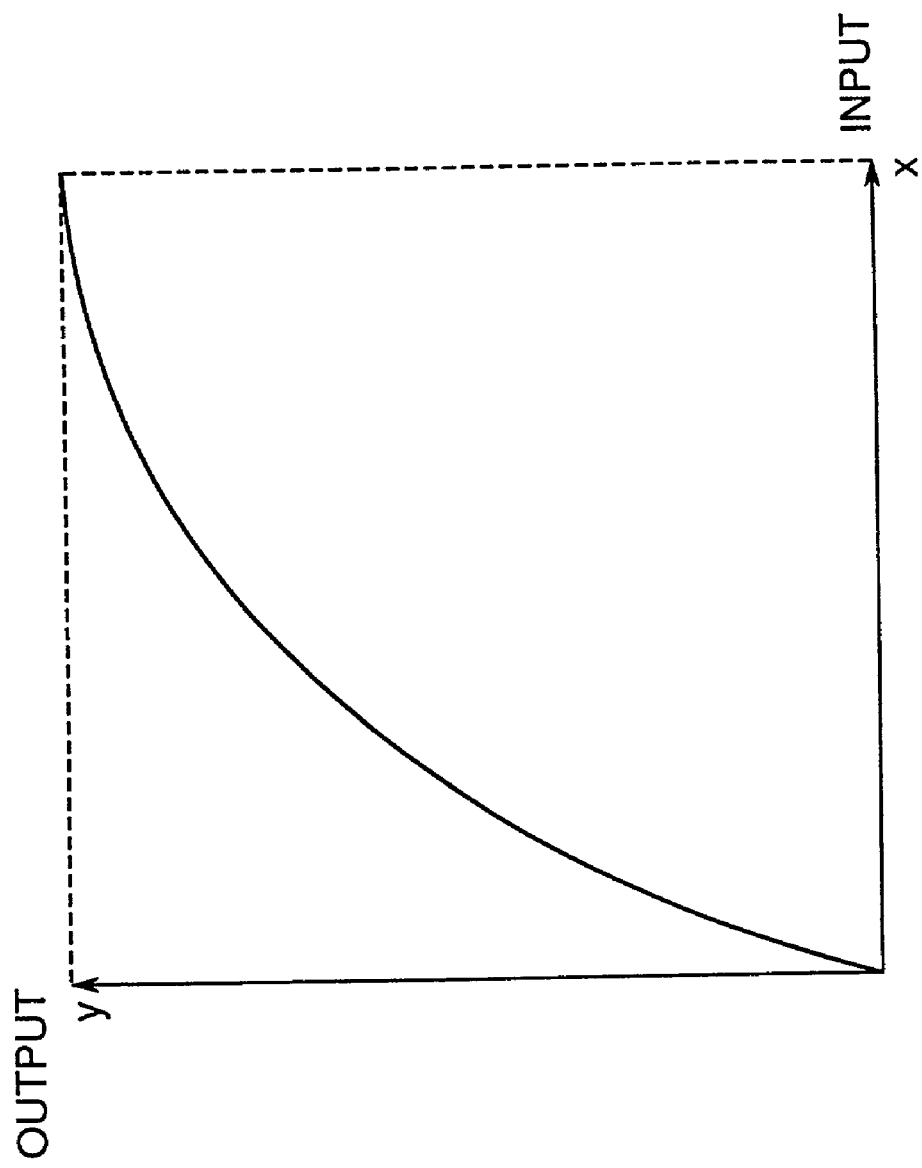
FIG. 10 is a diagram illustrating the input/output relationship of the gamma correction circuit 90.

FIGS. 9 and 10 are drawings illustrating the input/output relationships of the gamma correction circuits 44 and 46 in FIGS. 7 and 8 respectively. In the table in FIG. 9, $y=x$, while in the table in FIG. 10, $y=x^{0.45}$. This is an example of where $\gamma 1 = 1$, $\gamma 2 = 0.45$ as above. Where $\gamma 1 = 1$ is selected as in FIG. 9, there is no particular reason to use a look-up table, and the circuit can be omitted.

(Embodiment 3)

Figure 11:
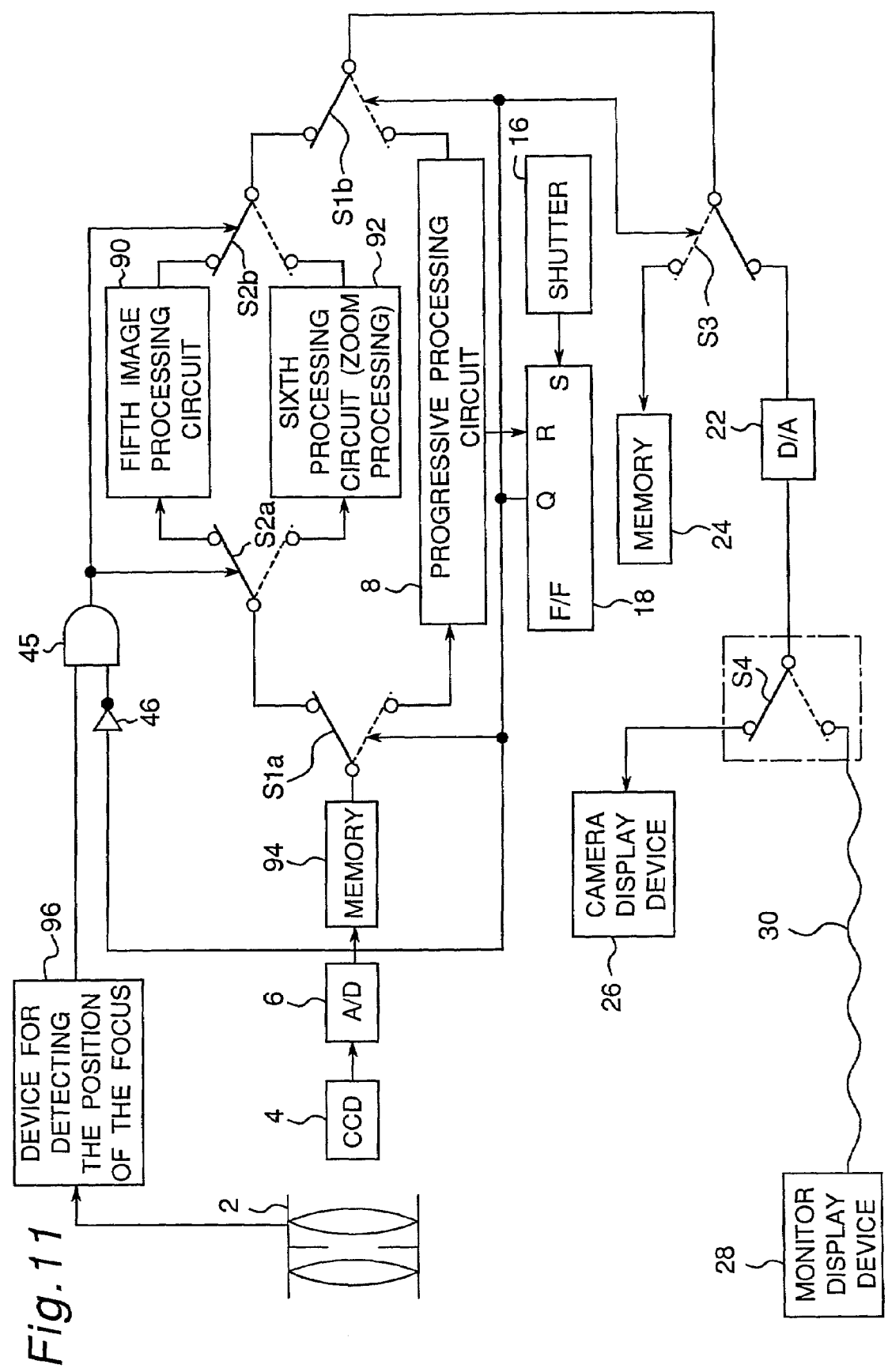
FIG. 11 is a block diagram illustrating the third embodiment of the digital camera with interchangeable displays to which the present invention pertains.

FIG. 11 is a block diagram illustrating the third embodiment of the digital camera with interchangeable displays to which the present invention pertains, and depicts a device for changing the display based on the results of detecting the position of the focus. In the device to which the present invention pertains, an image processed in the normal manner is displayed if the position of the focus is at infinity, whereas an enlarged image is displayed if the position of the focus is not at infinity.

In FIG. 11, means for capturing an image is composed of a lens 2 and a charge-coupled device (CCD) 4. 6 is an A/D converter, 94 is a memory which temporarily stores the output of the CCD after A/D conversion, 90 is a fifth image processing circuit whereby signals of the normal scaling ratio are processed, 92 is a sixth processing circuit whereby zoom (enlarged) signal processing is implemented, 96 is a device for detecting the position of the focus, 22 is a D/A converter, 24 is a memory which memorizes the image which has been captured, 45 is an AND circuit, 46 is a NOT circuit, 26 is the display device attached to the main body of the camera, preferably a liquid crystal display device, S1a and S1b are first interlocking switches which change according to the Q output of the flip-flop 18, S2a and S2b are second interlocking switches which change according to the output of the means 96 of detecting the position of the focus and the shutter button 16, S3 is a third switch which changes according to the Q output of the flip-flop 18, and S4 is a fourth switch which changes according to whether the video cable 30 from the monitor display device 28 is inserted or not, and constitutes the image output terminal.

When the shutter button 16 is not being depressed, a low-level signal is output from the Q output of the flip-flop 18, and the output of the means 96 of detecting the position of the focus is output without any modification from the AND circuit 45. In this case, the switches S1 are set in the positions denoted by the unbroken lines.

The CCD 4 in the present embodiment has, for instance, a color filter of the type shown in FIG. 2 on its surface. The number of pixels is 640 horizontal '480 vertical, and a color signal output of 640 horizontal '240 vertical is obtained as a result of PDMix mode reading. The color signal is quantified in the A/D conversion circuit 6 and stored temporarily in the memory 94. The color signal which is stored in the memory 94 is processed differently depending on whether in the state wherein the shutter button has not been released (ie while the user is adjusting the angle of the picture and the focus) the focal distance is infinity or not. The explanation which follows assumes that the shutter button has not been released.

Figure 12:
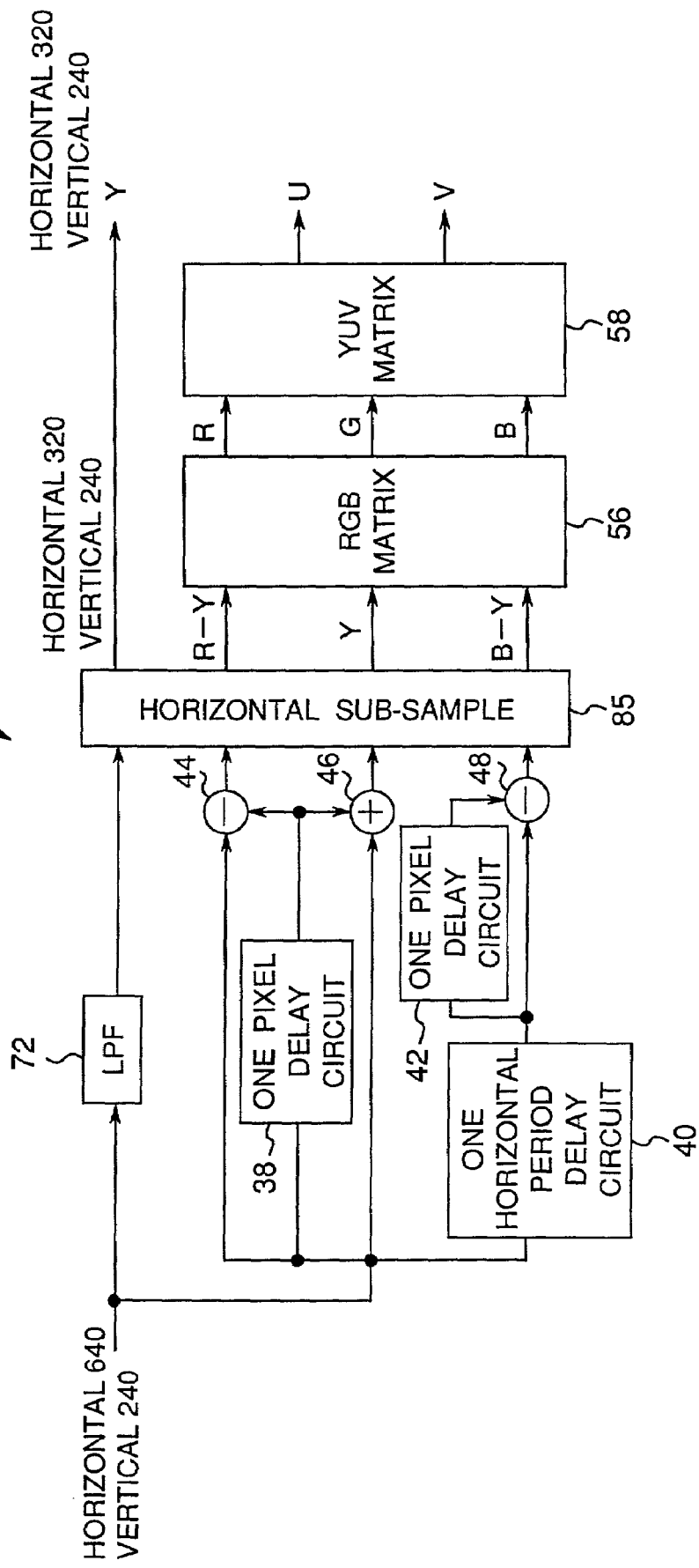
FIG. 12 is a block diagram illustrating the fifth image processing circuit 90 depicted in FIG. 11.

FIG. 12 is a block diagram illustrating the fifth image processing circuit 90 depicted in FIG. 11. In the drawing, 72 is an LPF, 85 is a horizontal sub-sampling circuit, 38 and 42 are one pixel delay circuits, 40 is a one horizontal period delay circuit, 44 and 48 are subtracters, 46 is an adder, 56 is an RGB matrix calculation circuit, and 58 is a YUV matrix calculation circuit.

The input color signal with 640 pixels horizontally and 240 vertically has 340 horizontal pixels sampled in the horizontal sampling circuit 85, as a result of which a Y/C output of 340 horizontal '240 vertical is obtained. The Y/C signal is converted to an analog signal in the D/A converter 22 and displayed on the built-in display device 26. The output obtained here is an image signal of the whole valid image area of the CCD (it has not been subject to zoom processing).

If the focal distance is not set at infinity, the means 96 of detecting the position of the focus outputs, for instance, a high-level signal, as a result of which the interlocking switches S2a and S2b are set in the positions denoted by the unbroken lines.

Figure 13:
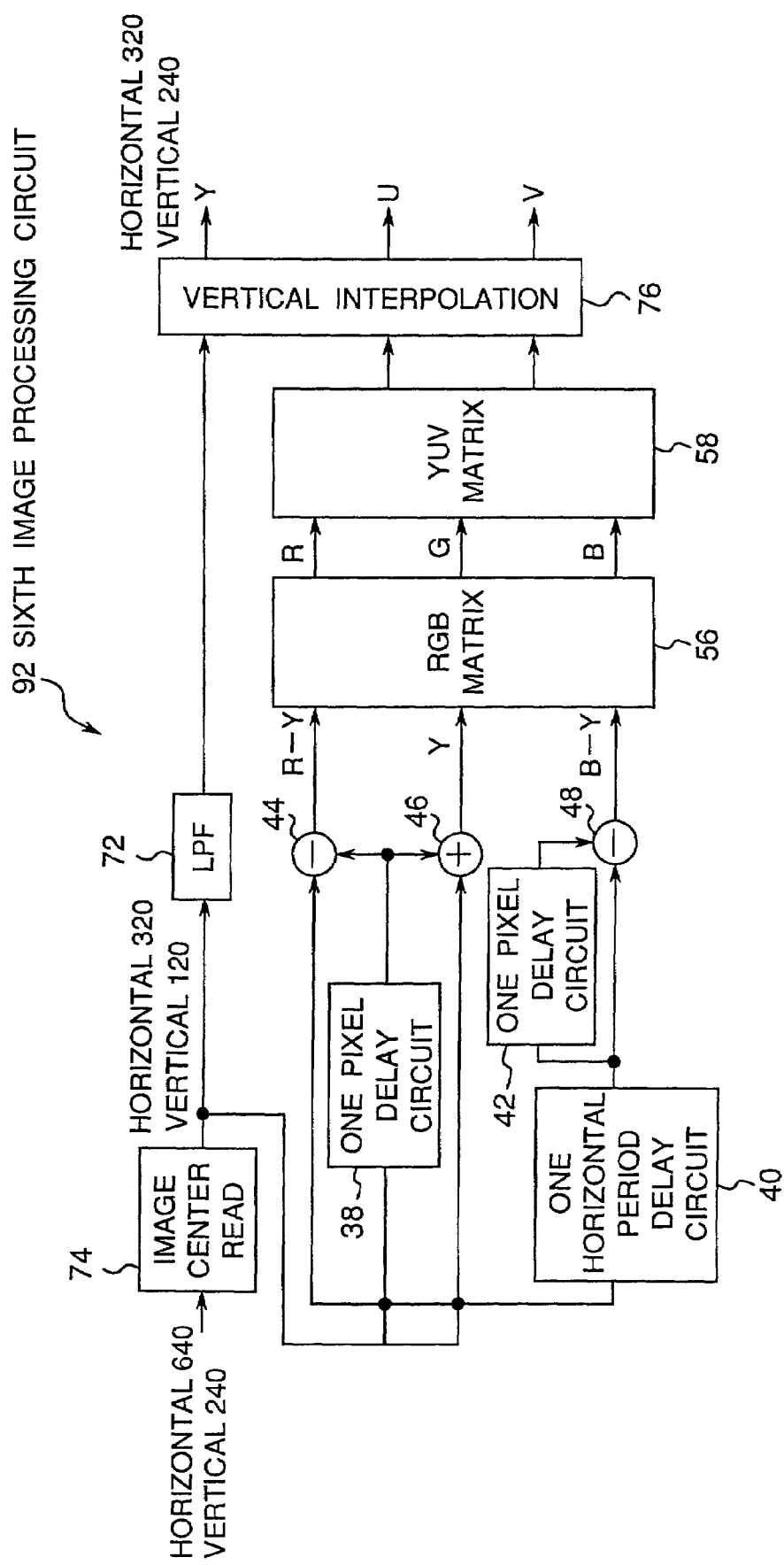
FIG. 13 is a block diagram illustrating the sixth image processing circuit 92 depicted in FIG. 11.

FIG. 13 is a block diagram illustrating the sixth image processing circuit 92 depicted in FIG. 11. In the drawing, 74 is an image center read circuit, and 76 is a vertical interpolation circuit.

Figure 14:
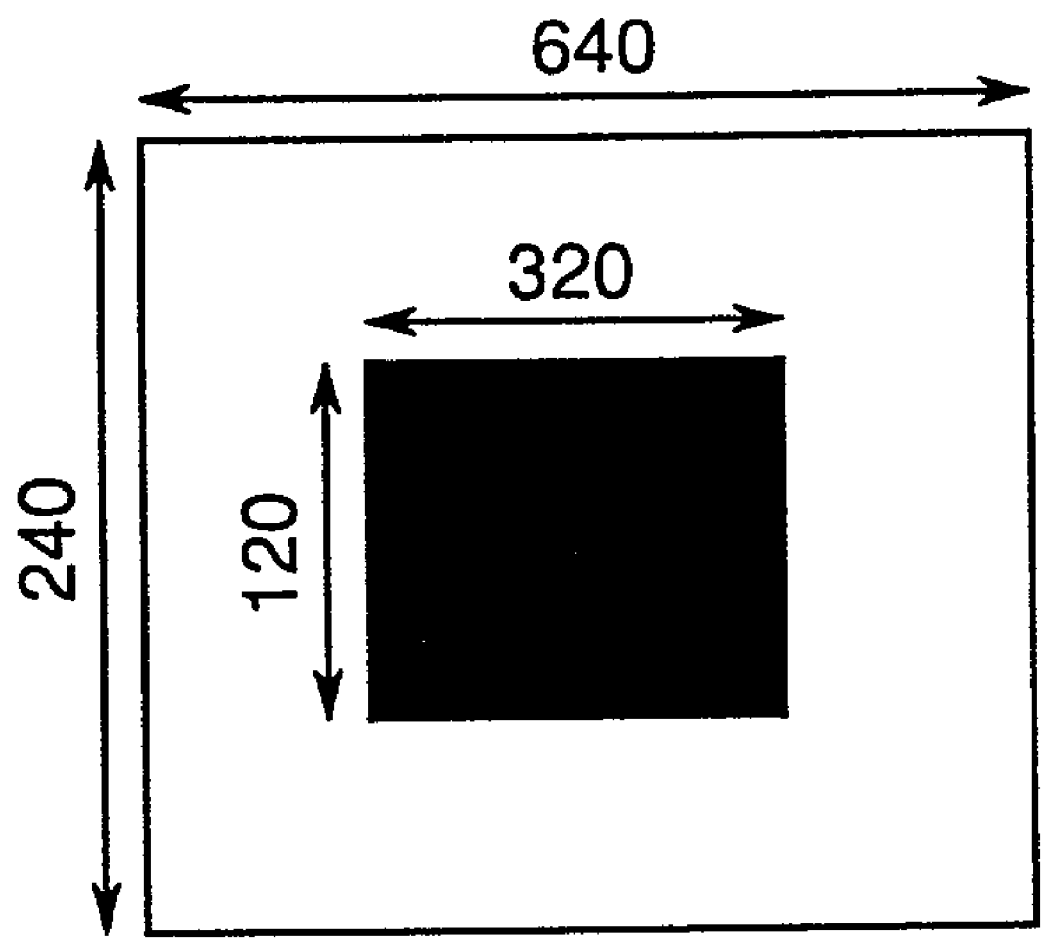
FIG. 14 is a block diagram illustrating the color data area which is read by the image center read circuit 74 depicted in FIG. 13.

FIG. 14 illustrates the area which is read by the image center read circuit 20. A color signal of 320 pixels horizontal '120 vertical of the part denoted in the drawing by shading is read from the memory, and after Y/C signal processing, vertical interpolation is implemented by lining the same signal up twice or by some other method, as a result of which a Y/C output of 340 pixels horizontal '240 vertical is obtained. The Y/C signal is converted to an analog signal in the D/A conversion circuit 22, and displayed on the in-built display device 26.

The output obtained here is an image signal with the center part of the valid image area of the CCD enlarged. Since there is no horizontal sampling in the fifth image processing circuit 90, it is possible to display a more detailed image than if the output of the fifth image processing circuit 90 were simply enlarged. Consequently, it makes it easy to adjust the focus manually while viewing the in-built display device.

The above is the action when the shutter button has not been released. If the shutter button is released, a high-level signal is output from the flip-flop, the switches S1a and S1b are set in the positions denoted by the broken lines, and the image signal processed in the progressive processing circuit is memorized in the memory 24.

(Embodiment 4)

Figure 15:
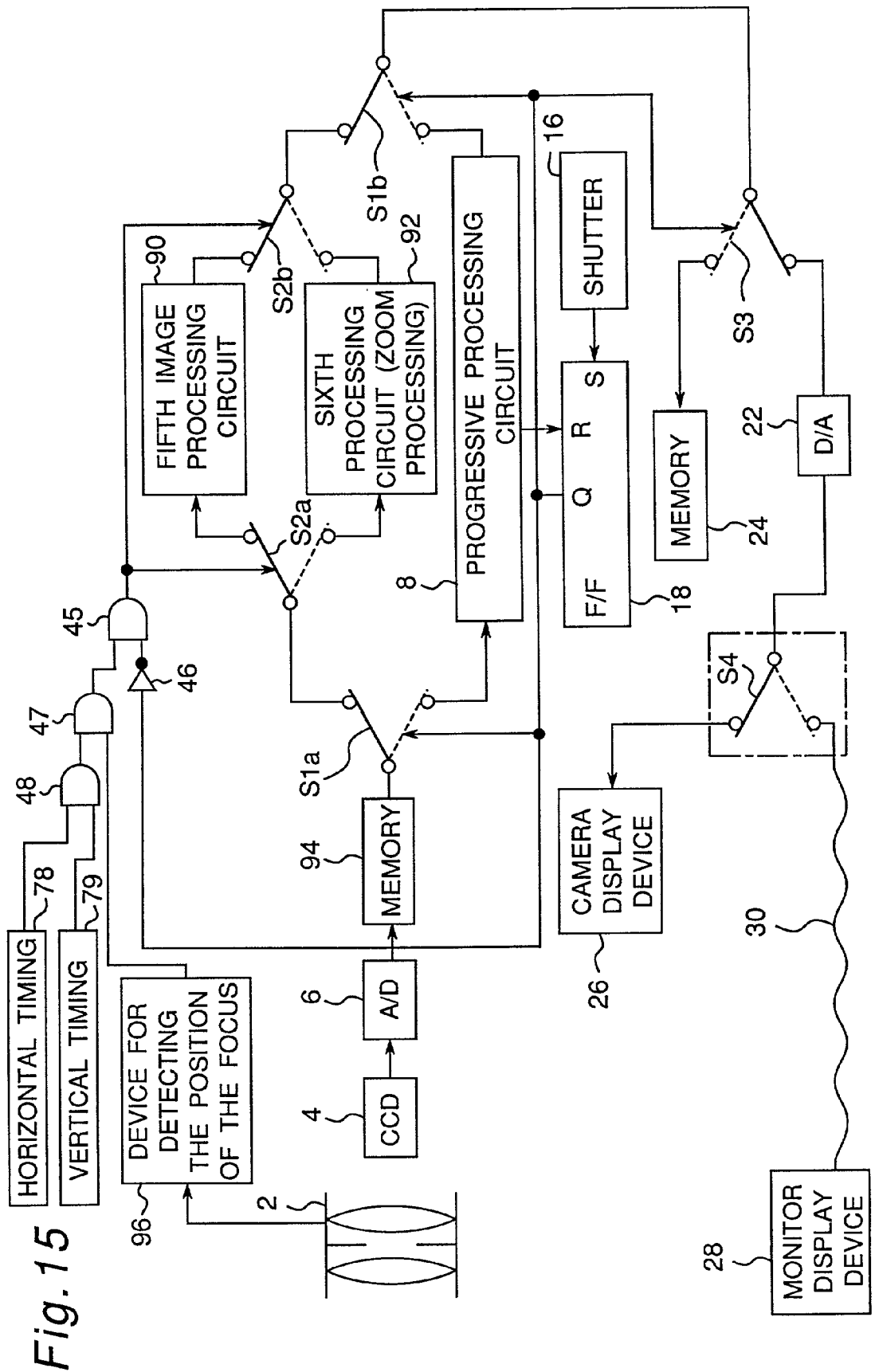
FIG. 15 is a block diagram illustrating the fourth embodiment of the digital camera with interchangeable displays to which the present invention pertains.

In Embodiment 3, an enlarged image is displayed over all the in-built display device while the focus is being adjusted. This suffers from the defect that it becomes difficult to adjust the angle of the picture. FIG. 15 illustrates a fourth embodiment of the present invention in which this has been improved. In FIG. 15, 78 is a circuit for generating horizontal timing, and 79 is a circuit for generating vertical timing, while 47 and 48 are AND circuits.

In this embodiment, if the shutter button has not been released and the focal distance is not set at infinity, only the high-level portions of the signals forming the output of the circuit for generating horizontal timing 30 and the circuit for generating vertical timing 31 are enlarged and displayed.

Figure 16A:
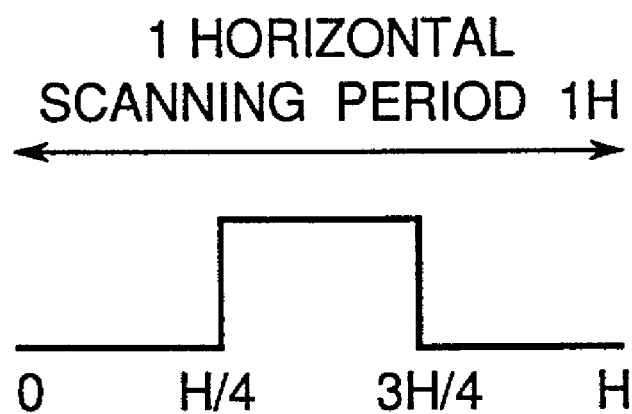
FIGS. 16A and 16B are waveform diagrams illustrating output signals from the circuit for generating horizontal timing 78 and the circuit for generating vertical timing 79.
Figure 17A:
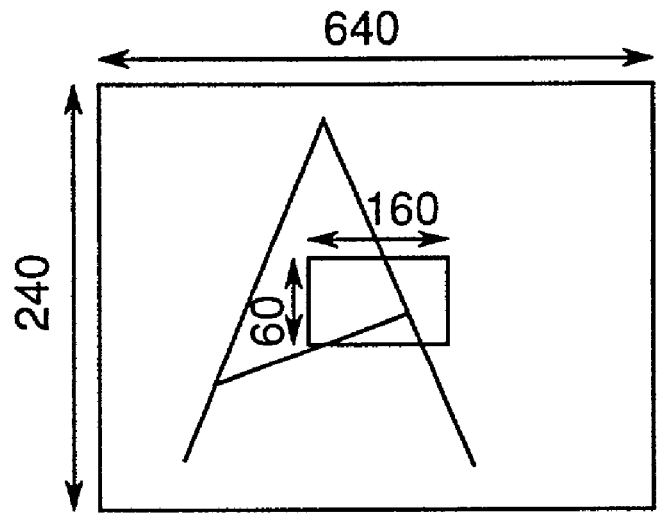
FIG. 17A is color data in the memory.

FIG. 16(a) and (b) are examples of output signals from the circuit for generating horizontal timing 78 and the circuit for generating vertical timing 79 respectively, while FIG. 17(a) and (b) are color data in the memory, and a conceptual drawing of image signals displayed on the built-in display device respectively.

Figure 16B:
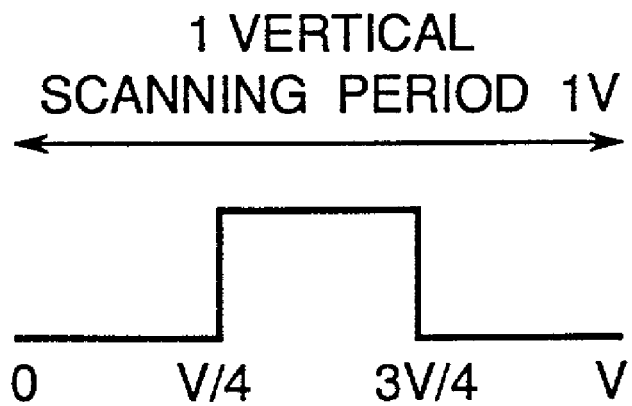
Figure 17B:
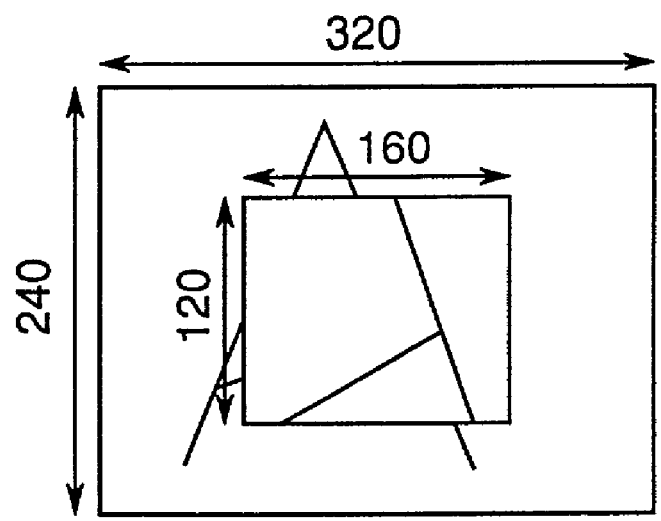
FIG. 17B is a conceptual drawing of image signals displayed on the display device which is built into the camera, both in the fourth embodiment of the digital camera with interchangeable displays to which the present invention pertains.

In the example illustrated in FIGS. 16 and 17, an image output is obtained in which only the center part of the screen, amounting to one half in both the horizontal and vertical directions, is enlarged and processed. This makes it possible to adjust the focus manually while viewing the center part of the image, and to adjust the angle while viewing the peripheral part of the image.

It remains to point out that in the first embodiment the first processing circuit 10, second processing circuit 12, progressive processing circuit 8 and other circuits may be constituted using a microcomputer. In this case, signal processing is implemented by the processor, so that it is possible to decrease the frequency of calculation for signal processing and increase the processing speed the greater the degree of culling.

Moreover, the second embodiment was described in such a manner that both the constant values and the gamma correction circuit were changed, but it is possible to change just one of them.

Furthermore, the first, second, third and fourth embodiments have been described in such a manner that the first processing circuit 10, second processing circuit 12, third processing circuit 80, fourth processing circuit 82, fifth processing circuit 90, sixth processing circuit 92 and progressive processing circuit 8 are all constituted separately, but it is possible for the first processing circuit 10, second processing circuit 12, third processing circuit 80, fourth processing circuit 82, fifth processing circuit 90, sixth processing circuit 92 and progressive processing circuit 8 to be constituted as one circuit by changing clock frequencies and providing a switch arrangement whereby additional circuits can be attached and detached.

Finally, the first, second, third and fourth embodiments have been described in such a manner that the second interlocking switches S2a and S2b have been changed in accordance with the output from the detector 14 which detects whether the video cable has been inserted or not, or from the device 96 for detecting the position of the focus, but this can be implemented manually or by other means.

What is claimed is:

1. A digital camera having a built-in display device and an image output terminal for transmitting image signals to an external monitor device, said digital camera comprising:
    shutter means for releasing a shutter;
    capturing means for capturing an image and for outputting pixel signals one after another;
    processing means for processing the image, said processing means having variable methods of processing;
    changing means for changing the method of processing of said processing means;
    feeding means for feeding the output of said processing means to the image output terminal; and
    detection means for detecting a position of focus while the shutter is not released, producing an output indicating the position of focus, and for changing the method of processing of said processing means according to the output of said detection means and before the shutter is released.

2. A digital camera having a built-in display device and an image output terminal for transmitting image signals to an external monitor device, said digital camera comprising:
    a shutter release operable to release a shutter;
    a capturing arrangement operable to capture an image and to output pixel signals one after another;
    a processor arrangement operable to process the image in variable methods;
    a changing arrangement operable to change the processing method of said processor arrangement;
    a feeding arrangement operable to feed the output of said processor arrangement to the image output terminal; and
    a detector operable to detect a position of focus while the shutter is not released, produce an output indicating the position of focus, and change the processing method of said processor arrangement according to the output of said detector and before the shutter is released.

3. A digital camera as claimed in claim 2, wherein said detector changes the processing method such that a rate of magnification of electronic zoom processing is changed according to the output of said detector.

* * * * *